United States Patent
Nulkar et al.

(10) Patent No.: US 8,078,718 B1
(45) Date of Patent: Dec. 13, 2011

(54) METHOD AND APPARATUS FOR TESTING A STORAGE SYSTEM HEAD IN A CLUSTERED FAILOVER CONFIGURATION

(75) Inventors: Chaitanya Nulkar, Sunnyvale, CA (US); Jeffrey A. Kemp, Santa Clara, CA (US); James R. Grier, Groton, MA (US); Jose Mathew, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1200 days.

(21) Appl. No.: 10/753,653

(22) Filed: Jan. 7, 2004

(51) Int. Cl.
*G06F 15/16* (2006.01)
*G06F 11/00* (2006.01)

(52) U.S. Cl. .......................................... 709/224; 714/4.5

(58) Field of Classification Search .................. 709/223, 709/224–226; 714/100, 2, 11, 12, 4.5, 5.1, 714/5.11, 6.13
See application file for complete search history.

(56) References Cited

U.S. PATENT DOCUMENTS

| | | | |
|---|---|---|---|
| 6,609,213 B1 * | 8/2003 | Nguyen et al. | 714/4 |
| 6,732,289 B1 * | 5/2004 | Talagala et al. | 714/6 |
| 7,043,663 B1 * | 5/2006 | Pittelkow et al. | 714/4 |
| 7,268,690 B2 * | 9/2007 | Nguyen et al. | 340/588 |
| 2003/0105850 A1 * | 6/2003 | Lean et al. | 709/223 |
| 2003/0140107 A1 * | 7/2003 | Rezvani et al. | 709/208 |
| 2005/0154841 A1 * | 7/2005 | Sastri et al. | 711/148 |

* cited by examiner

*Primary Examiner* — Chirag Patel
(74) *Attorney, Agent, or Firm* — Blakely, Sokoloff, Taylor & Zafman LLP (57) ABSTRACT

A first storage server head and a second storage server head are operated and are configured redundantly to provide a host with access to a plurality of mass storage devices. A diagnostic process is executed in the first storage server head to assess operational status of the second storage server head while the second storage server head is in a mode for providing the host with access to the plurality of mass storage devices.

40 Claims, 7 Drawing Sheets

METHOD AND APPARATUS FOR TESTING A STORAGE SYSTEM HEAD IN A CLUSTERED FAILOVER CONFIGURATION

FIELD OF THE INVENTION

At least one embodiment of the present invention pertains to storage systems, and more particularly, to a method and apparatus for testing a storage system head in a clustered failover configuration.

BACKGROUND

A file server is a network-connected processing system that stores and manages shared files in a set of storage devices (e.g., disk drives) on behalf of one or more clients. The disks within a file system are typically organized as one or more groups of Redundant Array of Independent/Inexpensive Disks (RAID). One configuration in which file servers can be used is a network attached storage (NAS) configuration. In a NAS configuration, a file server can be implemented in the form of an appliance that attaches to a network, such as a local area network (LAN) or a corporate intranet. An example of such an appliance is any of the Filer products made by Network Appliance, Inc. in Sunnyvale, Calif.

Another specialized type of network is a storage area network (SAN). A SAN is a highly efficient network of interconnected, shared storage devices. Such devices are also made by Network Appliance, Inc. One difference between NAS and SAN is that in a SAN, the storage appliance provides a remote host with block-level access to stored data, whereas in a NAS configuration, the file server normally provides clients with only file-level access to stored data.

Figure 1:
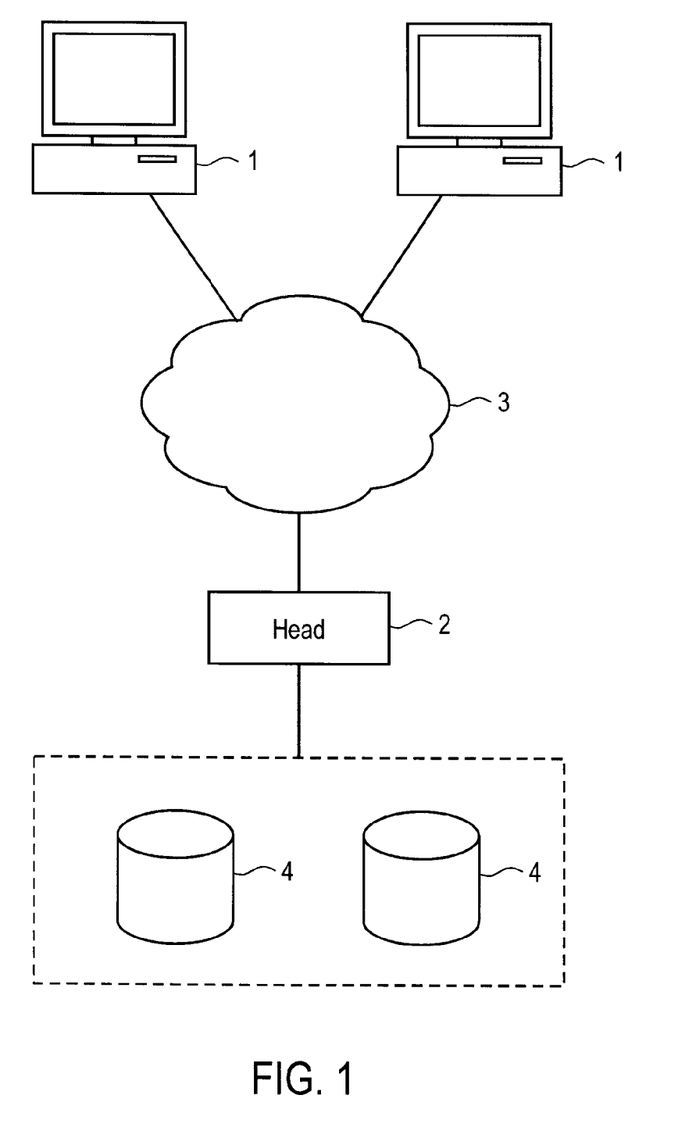
FIG. 1 shows an example of a NAS network configuration.

A simple example of a NAS network configuration is shown in FIG. 1. A filer (file server) "head" 2 is coupled locally to a set of mass storage devices 4 and to a set of clients 1 through a network 3. The filer head 2 receives various read and write requests from the clients 1 and accesses the mass storage devices 4 to service those requests. Each of the clients 1 may be, for example, a conventional personal computer (PC), workstation, or the like. The mass storage devices 4 may be, for example, conventional magnetic disks, optical disks such as CD-ROM or DVD based storage, magneto-optical (MO) storage, or any other type of non-volatile storage devices suitable for storing large quantities of data.

In this context, a "head" (as in filer head 2) means all of the electronics, firmware and/or software (the "intelligence") that is used to control access to a set of mass storage devices; it does not include the mass storage devices themselves. In a file server, the head normally is where all of the "intelligence" of the file server resides. Note that a "head" in this context is not the same as, and is not to be confused with, the magnetic or optical head that is used to physically read or write data from or to the mass storage medium. The network 3 can be essentially any type of computer network, such as a local area network (LAN), a wide area network (WAN), metropolitan area network (MAN), or the Internet.

Figure 2:
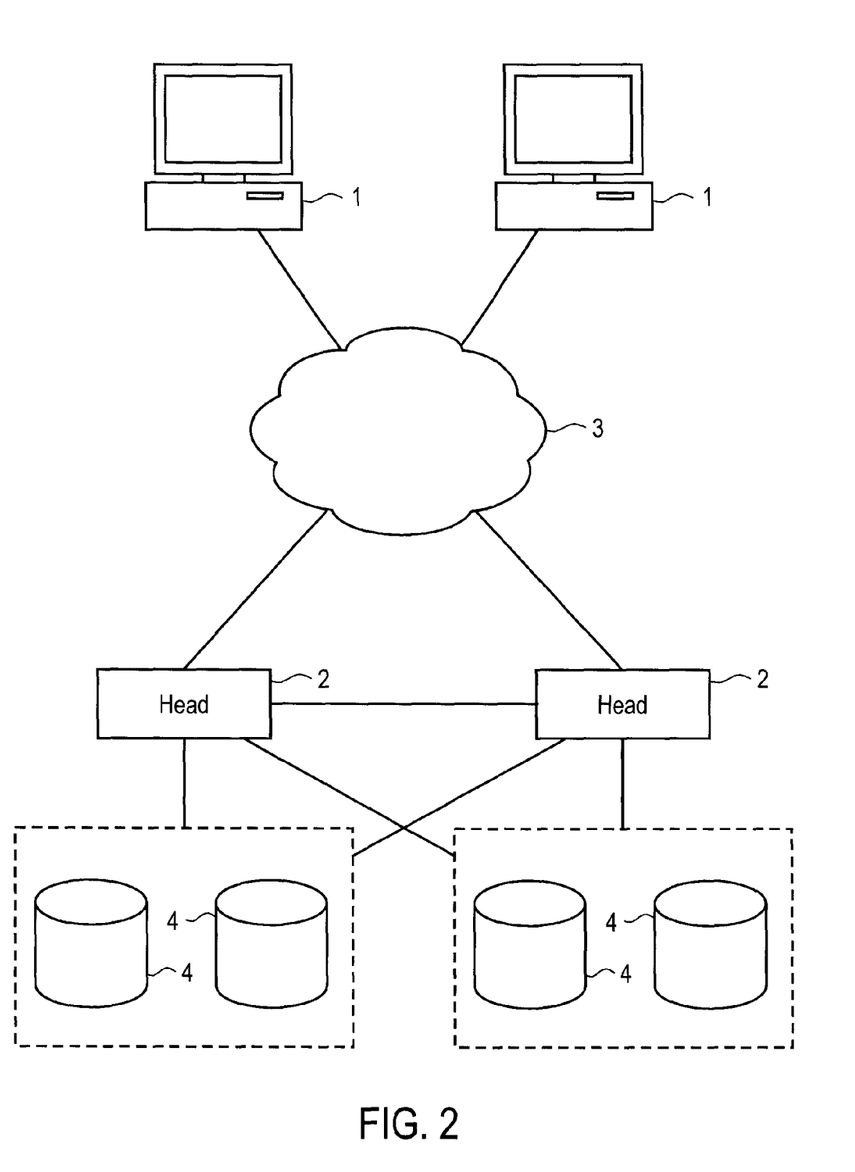
FIG. 2 shows an example of a NAS network configuration which includes a clustered failover (CFO) pair.

Filers are often used for data backup and recovery applications. In these applications, it is desirable to protect against as many potential failure scenarios as possible. One possible failure scenario is the failure of a filer head. One approach which has been used to protect against the possibility of a filer head failure is known as clustered failover (CFO). CFO involves the use of two or more redundant filer heads, each having "ownership" of a separate set of mass storage devices. CFO refers to a capability in which two or more interconnected heads are both active at the same time, such that if one head fails or is taken out of service, that condition is immediately detected by the other head, which automatically assumes the functionality of the inoperative head as well as continuing to service its own client requests. A file server "cluster" is defined to include at least two file server heads connected to at least two separate volumes of disks. FIG. 2 illustrates an example of a CFO configuration. As shown, each filer head's mass storage devices are "visible" to the other filer, via a high-speed interconnect. In the event one head fails, the other head takes over ownership of the failed head's mass storage devices.

In a CFO configuration it is desirable for one head to have the ability to perform diagnostics on the other head (or heads), to assess its operational status. Moreover, it is desirable to have the ability to perform such diagnostics without taking the head under test out of its normal operational mode.

SUMMARY OF THE INVENTION

A first storage server head and a second storage server head are operated and are configured redundantly to provide a host with access to a plurality of mass storage devices. A diagnostic process is executed in the first storage server head to assess operational status of the second storage server head while the second storage server head is in a mode for providing the host with access to the plurality of mass storage devices.

Other aspects of the invention will be apparent from the accompanying figures and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for testing a head in a storage system that contains multiple heads configured for CFO are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As described in greater detail below, a standalone storage system according to certain embodiments includes two heads connected by a passive backplane and configured as CFO pair. Each head includes an operating system kernel and a separate diagnostic kernel. During a cluster interconnect test, one head runs the diagnostic kernel to assess the operational status of the other head and the connection between the two heads, while the head under test (HUT) runs its operating system kernel and is available to serve clients. The test is used by the diagnostic kernel to determine, among other things, whether the HUT is properly running its operating system. The diagnostic kernel uses this knowledge to avoid testing hardware shared by both heads that may be in use by operating system.

Figure 3:
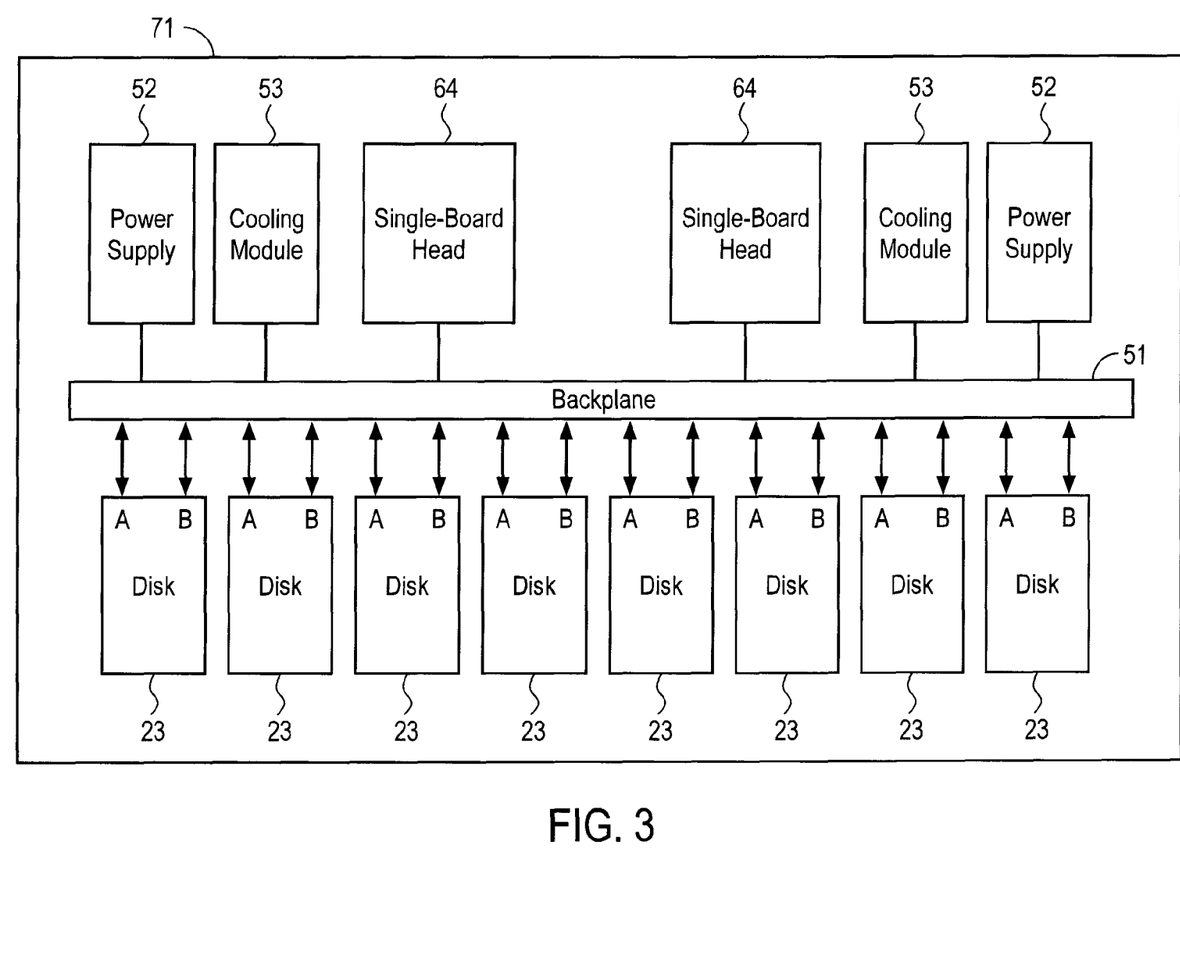
FIG. 3 is a hardware layout block diagram of a dual-head standalone filer.

FIG. 3 is a hardware layout block diagram of a standalone storage system 71, such as a filer. All of the illustrated components are contained within a single chassis. In the illustrated embodiment, the major components of the system 71 are connected to, and communicate via, a passive backplane 51. The backplane 51 is "passive" in that it has no active electronic circuitry mounted on or in it; it is just a passive communications medium. The backplane 51 can be essentially comprised of just one or more substantially planar substrate layers (which may be conductive or which may be dielectric with conductive traces disposed on/in it), with various pin-and-socket type connectors mounted on it to allow connection to other components inside the chassis.

Connected to the backplane 51 are several individual disk drives 23, redundant power supplies 52 and associated cooling modules 53, and two heads 64. For purposes of this description, it can be assumed that the heads 64 are configured to operate in CFO mode, such that each of the heads 64 owns a separate subset of the disk drives 23. Connecting the heads 64 to the backplane 51 is advantageous, because (among other reasons) it eliminates the need for cables or wires to connect the heads 64. Note that although the system 71 includes two heads 64, the system 71 can operate as a standalone system with only one head 64.

Figure 4:
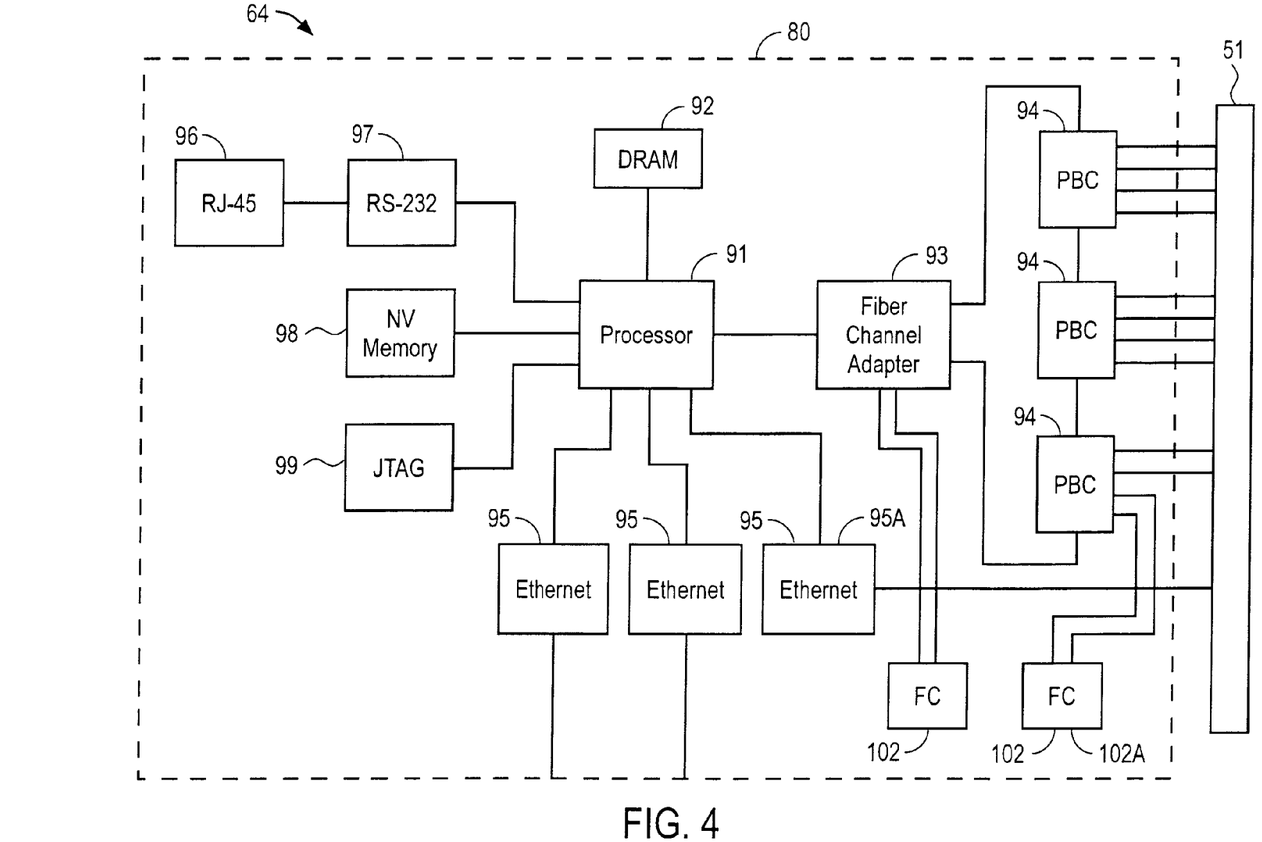
FIG. 4 is a block diagram of a single-board head for use in the filer of FIG. 3.

FIG. 4 is a block diagram of a head 64, according to certain embodiments of the invention. In certain embodiments, each of the heads 64 in the system 71 is implemented on a single circuit board 80. The single-board head 64 includes (mounted on a single circuit board 80) a processor 91, dynamic read-only memory (DRAM) 92 in the form of one or more dual inline memory modules (DIMMs), an integrated circuit (IC) Fibre Channel adapter 93, and a number of Fibre Channel IC port bypass circuits (PBCs) 94. The processor 91 controls the operation of the head 64. The DRAM 92 serves as the main memory of the head 64 and is used by the processor 91.

The PBCs 94 are connected to the processor 91 through the Fibre Channel adapter 93 and can be connected to the passive backplane 51 through standard pin-and-socket type connectors (not shown) mounted on the circuit board 80 and on the backplane 51. The PBCs 94 are connected to the Fibre Channel adapter 93 in a loop configuration. In operation, each PBC 94 can communicate (through the backplane 51) separately with two or more disk drives installed within the same chassis. Normally, each PBC 94 is responsible for a different subset of the disk drives within the chassis. Each PBC 94 provides loop resiliency with respect to the disk drives for which it is responsible, to protect against a disk drive failure. In other words, in the event a disk drive fails, the associated PBC 94 will simply bypass the failed disk drive. Examples of PBCs with such functionality are the HDMP-0480 and HDMP-0452 from Agilent Technologies in Palo Alto, Calif., and the VSC7127 from Vitesse Semiconductor Corporation in Camarillo, Calif.

The head 64 also includes a number (three in the illustrated embodiment) of IC Ethernet adapters 95. In the illustrated embodiment, two of the Ethernet adapters 95 are coupled to external connectors to allow them to be connected to devices outside the chassis for network communication (e.g., to clients and/or a management station). The third Ethernet adapter 95A is connected only to the backplane 51 and is used only for head-to-head communication, as described further below.

The head 64 further includes (mounted on the circuit board 80) a standard RJ-45 connector 96 which is coupled to the processor 91 through a standard RS-232 transceiver 97. This connector-transceiver pair 96 and 97 allows an external terminal operated by a network administrator to be connected to the head 64, for purposes of remotely monitoring or configuring the head 64 or other administrative purposes.

The single-board head 64 also includes (mounted on the circuit board 80) at least one non-volatile memory 98 (e.g., Flash memory or the like), which stores information such as boot firmware, a boot image, test software and the like. The test software includes a diagnostic kernel which used to run diagnostics on the other head 64 and the head-to-head interconnect, as described further below.

The head 64 further includes a number of Fibre Channel connectors 102 to allow connection of the head 64 to external components. One of the Fibre Channel connectors 102 is coupled directly to the Fibre Channel adapter 93, while another Fibre Channel connector 102A is coupled to the Fibre Channel adapter 93 through one of the PBCs 94. Fibre Channel connector 102A can be used to connect the head 64 to an external disk shelf. Although the head 64 allows the enclosure to be used as a standalone file server without any external disk drives, it may nonetheless be desirable in some cases to connect one or more external shelves to the enclosure to provide additional storage capacity. The head 64 also includes a connector 99 to allow testing of the single-board head 64 in accordance with JTAG (IEEE 1149.1) protocols.

In certain embodiments, the processor 91 in the head 64 is programmed (by instructions and data stored in memory 92 and/or in memory 98) so that the enclosure is operable as both a NAS filer (using file-level accesses to stored data) and a SAN storage system (using block-level accesses to stored data) at the same time, i.e., to operate as a "unified" storage device, sometimes referred to as fabric attached storage (FAS) device. In other embodiments, the single-board head 64 is programmed so that the enclosure is operable as either a NAS file server or a SAN storage, but not at the same time, where the mode of operation can be determined after deployment according to a selection by a user (e.g., a network administrator). In other embodiments of the invention, the single-board head 64 is programmed so that the enclosure can operate only as a NAS file server or, in still other embodiments, only as a SAN storage system.

As noted above, the heads 64 in the storage system 71 may be programmed to operate as a CFO (redundant) pair. In the illustrated embodiment, the heads 64 communicate with each other only via the passive backplane 51. In certain embodiments, the heads 64 communicate through the backplane 51 using M-VIA (emulated Virtual Interface Architecture) over Gigabit Ethernet protocol. In other embodiments, however, other protocols may be used instead for communication between the heads 64.

Figure 5:
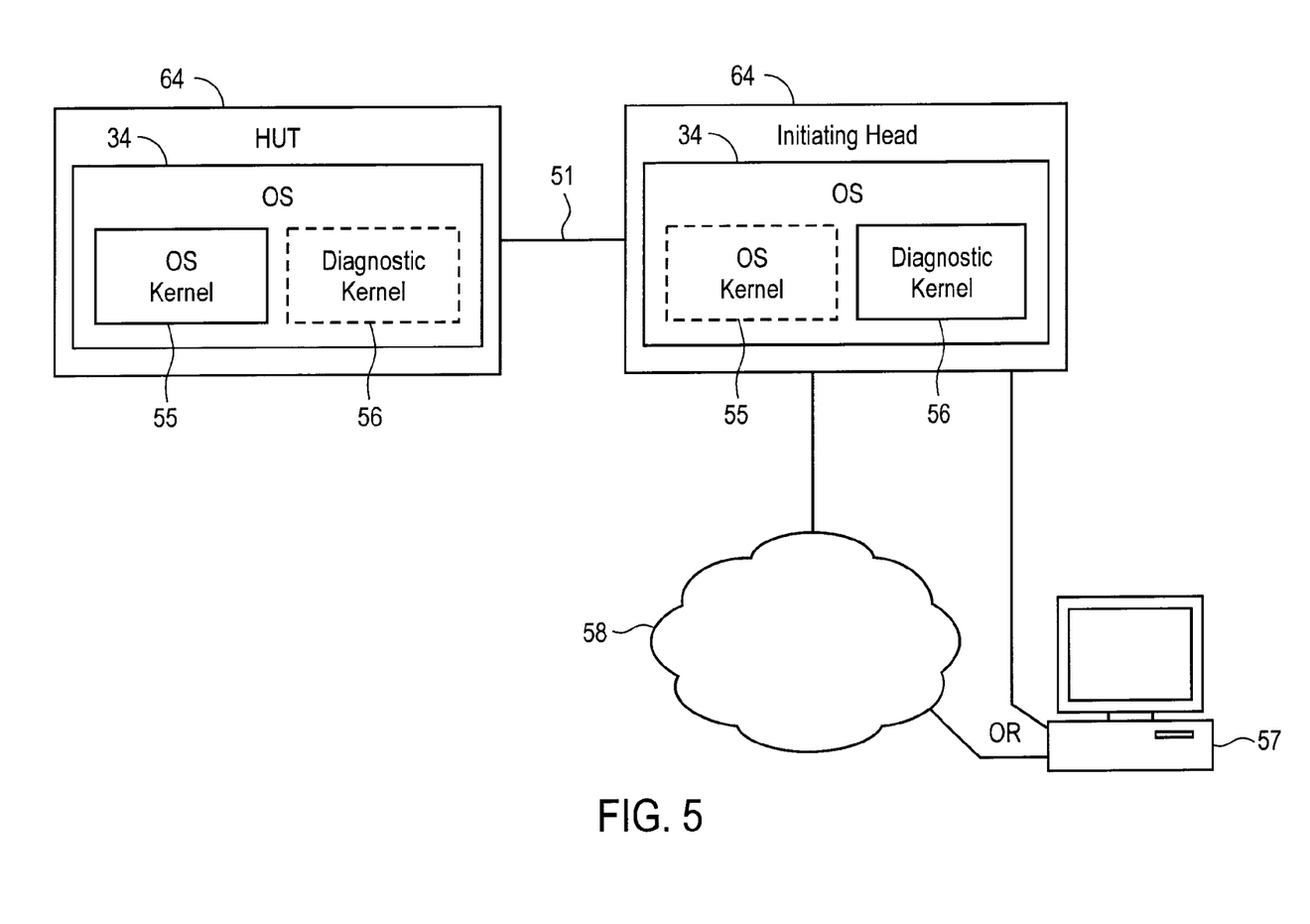
FIG. 5 illustrates two filer heads, each containing a diagnostic kernel, and a management station connected thereto.

Referring now to FIG. 5, in accordance with the invention, each of the heads 64 includes an operating system 34, which includes an operating system kernel ("OS kernel") 55 and a separate diagnostic kernel 56. The OS kernel 55 is the core of the operating system 34 and is the software which controls the normal (client service related) operations of the head 64. The diagnostic kernel 56 is configured to run a test to assess the operational status of the other head and the connection between the two heads, while the head under test (HUT) runs its OS kernel 55 and is available to serve clients 1. The operating system 34 is described in further detail below.

During the diagnostic test, the OS kernel 55 in the head that is not under test (the "initiating head") and the diagnostic kernel 56 in the HUT are quiescent (as indicated by the dashed lines in FIG. 4). The diagnostic test determines, among other things, whether the HUT is properly running its operating system 34. The diagnostic kernel 56 uses this knowledge to avoid testing hardware shared by both heads that may be in use by operating system 34. The test may be initiated from a management station 57, and similarly, the results of the test may be output by the initiating head and displayed on the management station 57. The management station 57 may be a terminal, PC, or workstation, for example, and may be coupled to the initiating head either directly or through a network 58.

Figure 6:
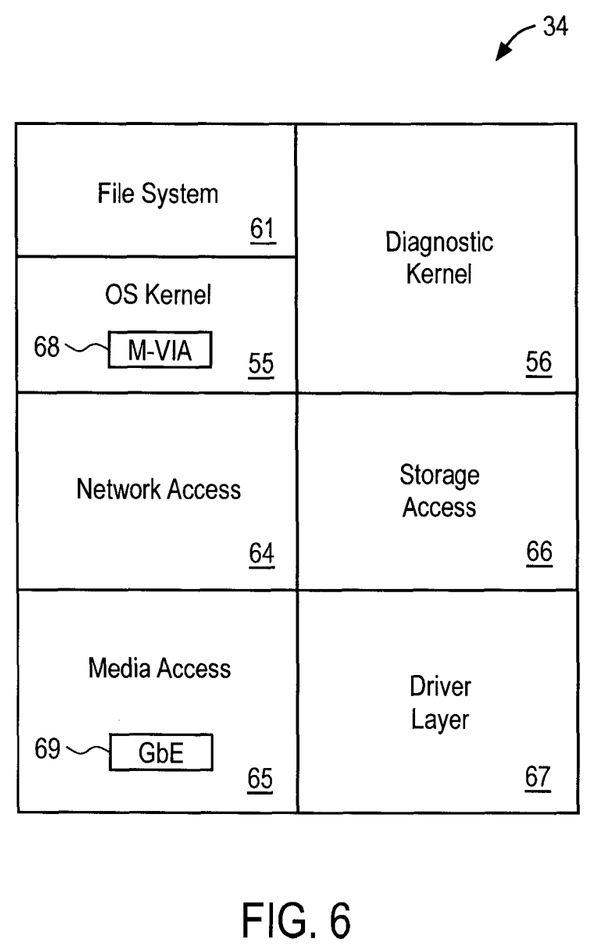
FIG. 6 illustrates the operating system of each of the heads in FIG. 3.

FIG. 6 illustrates a logical view of the operating system 34 of each head 64, according to certain embodiments of the invention. As can be seen, the operating system 54 includes a number of layers, which include a file system 61. The file system 61, among other responsibilities, executes read and write operations on the mass storage devices in response to client requests, maintains directories, and manages consistency point operations. An example of a file system suitable for this purpose is the Write Anywhere File Layout to (WAFL) file system from Network Appliance, such as used in the NetApp Filers. The file system 61 operates on blocks of data of a predetermined size, such as 4 kbytes.

Below the file system layer 61 is the OS kernel 55. In accordance with the invention, the OS kernel 55 includes an M-VIA sublayer 68, to allow communication between the heads 64 (via the backplane 51) using M-VIA. The operating system 34 also includes the diagnostic kernel 56, which in certain embodiments is a stripped down version of the OS kernel 55, but without the file system 61, and with the added functionality described below.

Below the OS kernel 55, on the network side the operating system 34 includes a network access layer 64 and, at the lowest level, a media access layer 65. The network access layer 64 implements any of various protocols used to communicate with client devices, such as network file system (NFS), common Internet file system (CIFS) and/or hypertext transport protocol (HTTP). The media access layer 65 includes one or more drivers which implemented the protocols used to communicate over the network, such as Ethernet. In accordance with the invention, the media access layer 65 includes a Gigabit Ethernet (GbE) sublayer 69, to allow communication between the heads 64 (via the backplane 51).

Below the kernel layer 62 on the storage device side, the operating system 34 includes a storage access layer 66 and, at the lowest level, a driver layer 67. The storage access layer 66 implements a disk storage protocol such as RAID, while the driver layer 67 implements a lower-level storage device access protocol, such as Fibre Channel or SCSI.

The test performed by the diagnostic kernel 56 is carried out using the Ethernet port 95A (FIG. 4) that is used as the cluster interconnect between the two heads 64. The initiating head sends a known number of diagnostic packets through the backplane interconnect to the other head (the HUT) with random content, and the initiating head expects to receive a reply back from the HUT. All of the diagnostic packets include a header which contains the same predetermined identifier (ID), such as 0x661 in certain embodiments. If the operating system 34 in the HUT is running properly, the M-VIA sublayer 68 in the HUT will receive the packets, detect that they are diagnostic packets based on their headers, and will loop the packets back (retransmit them) to the initiating head. If the HUT is not running its operating system 34, the diagnostic packets will be dropped. The test verifies the correctness of any reply packets sent back by the HUT, thereby achieving a loop back test.

The test provides the following functions:

1) verifies that the cluster interface is connected and a network link between the two heads is present;

2) verifies that the data path between cluster partners is functional;

3) verifies packet integrity over the cluster interconnect and provides error detection;

4) detect whether any errors originate in the HUT or the initiating head; and 5) informs diagnostics whether the operating system is running on the HUT.

Figure 7:
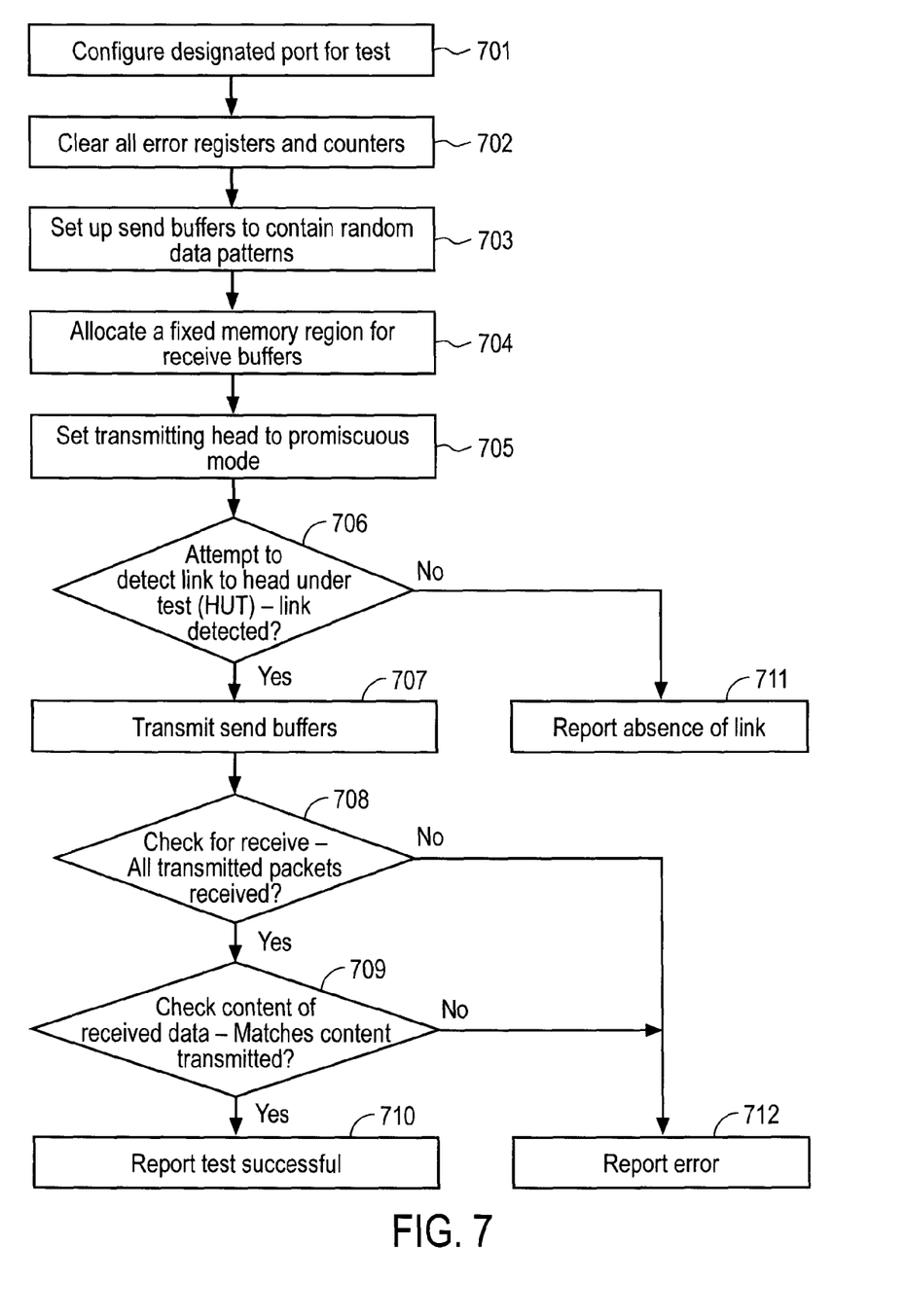
FIG. 7 illustrates a process performed by the diagnostic kernel in a head.

FIG. 7 illustrates in greater detail the testing process performed by the diagnostic kernel 56 in the initiating head, according to certain embodiments of the invention. As noted above, the process may be initiated by a user command from a management station. Initially, at block 701 the diagnostic kernel 56 in the initiating head configures the Ethernet port 95A, which connects the two heads 64, by setting its speed appropriately for the test (e.g., to 1 Gbit/sec) and by setting its mode to half-duplex. The diagnostic kernel 56 then clears all error registers and counters for the port at block 702. At block 703 the diagnostic kernel sets up the port's send buffers to contain diagnostic packets with random patterns of data. In certain embodiments, a fixed number (e.g., 128) of diagnostic packets are sent, each having a fixed data size (e.g., 1 kbyte). Each packet has the predetermined header pattern, so that the M-VIA sublayer 68 of the HUT can identify the packets as diagnostic packets. At block 704 the diagnostic kernel allocates a fixed memory region for the port's receive buffers, to receive the diagnostic packets when they are returned by the HUT.

Next, at block 705 the initiating head is set to "promiscuous" mode (i.e., to receive all packets communicated via the head-to-head port 95A). At block 706 the diagnostic kernel 56 attempts to detect a link to the HUT, to verify connectivity with the HUT. If a link is detected, the process proceeds to block 707; otherwise, the diagnostic kernel 56 generates a report at block 711 indicating the absence of a link. At block 708 the diagnostic kernel 56 transmits all of the above-mentioned send buffers. The send buffers are chained into the transmit descriptor ring and, in certain embodiments, are sent by direct memory access (DMA), 128 buffers at a time. At block 709 the diagnostic kernel 56 then checks whether all of the diagnostic packets have been received back from the HUT. If all of the diagnostic packets have not been returned, the diagnostic kernel 56 generates a report indicating this as an error condition at block 712. If all packets have been returned, the diagnostic kernel 56 then examines the contents of the returned packets at block 709 to determine whether the contents match the contents of the diagnostic packets that were sent. If the contents do not match, the diagnostic kernel 56 generates a report indicating this as an error condition at block 712. If all packets were received back from the HUT and the contents of all packets were verified, the diagnostic kernel 56 generates a report indicating the test was successful.

In the HUT, when the M-VIA sublayer 68 detects receipt of a packet containing the predetermined header pattern, it recognizes the packet as a diagnostic packet and simply sends the packet back to the initiating head (via the backplane), without passing the packet to the kernel layer 62 or allowing processing of the packet. If the operating system 34 is not running on the HUT, any diagnostic packets transmitted by the initiating head will not be returned.

In certain embodiments, for each test the diagnostic kernel 56 gathers and reports to the user the following parameters regarding the transmitted diagnostic packets: total number of bytes, total number of frames, number of collisions, number of late collisions, number of excessive collisions, number of FCS errors, number of abort errors, number of bad frames, number of runt frames, and number of long frames. Similarly, in certain embodiments for each test the diagnostic kernel 56 gathers and reports to the user the following parameters regarding the received diagnostic packets: total number of bytes, total number of frames, number of multicast frames, number of broadcast frames, number of bad frames, number of runt frames, number of long frames, number of FCS errors, number of length errors, number of code errors and number of alignment errors.

Among other advantages, the above-described technique enables one head in a clustered system to test the cluster interconnect without affecting the other head. If the other head is serving data, it can continue to serve data while the test runs. The technique further enables the diagnostic kernel to know if the other head is running its operating system and to execute its tests with that knowledge. The test further serves as a vehicle for the operating system to communicate to the diagnostic kernel on the other head.

Note that the diagnostic techniques described above can also be applied in various other contexts. For example, these techniques can be applied in a system with modular, standalone heads which need not be implemented each on a single circuit board. The heads may be in separate enclosures from each other and/or from the mass storage devices. Further, these techniques can be applied in essentially any type of storage system which uses two or more heads, not just in a NAS environment; in particular, note that these techniques can also be applied in a SAN environment.

Thus, a method and apparatus for testing a head in a storage system that contains multiple heads configured for CFO have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
operating a first storage server head and a second storage server head configured redundantly to provide a host with access to a plurality of mass storage devices of a storage network, wherein each of the plurality of mass storage devices is coupled to a same interconnect, wherein each of the first storage server head and the second storage server head comprises an identical diagnostic kernel, either of which is operable to initiate a diagnostic process to communicate with the other storage server head; and
assessing an operational status of the second storage server head by executing the diagnostic process by the diagnostic kernel in the first storage server head to send a signal to communicate with the second storage server head over a passive backplane using a Gigabit Ethernet protocol, wherein the passive backplane comprises the same interconnect that is coupled to each of the plurality of mass storage devices, wherein the second storage server head receives the signal and responds to communicate the operational status of the second storage server head via the passive backplane, wherein the diagnostic process is executed while the second storage server head is in a mode for providing the host with access to the plurality of mass storage devices,
wherein each of the first and second storage server heads is configurable to receive both file-level access requests and block-level access requests to store data onto the mass storage devices, to provide one of a storage area network and a network attached storage as the storage network according to a user selection after deployment.

2. A method as recited in claim 1, wherein executing the diagnostic process comprises:
transmitting a set of data from the first storage server head onto an interconnect coupling the first storage server head to the second storage server head;
determining in the first storage server head whether at least some of the set of data has been returned by the second storage server head via the interconnect;
verifying, at the first storage server head, content of any of said data returned by the second storage server head; and
determining operational status of the second storage server head based on results of said verifying, wherein the interconnect coupling the first storage server head to the second storage server head is the same interconnect that is coupled to each of the plurality of mass storage devices.

3. A method as recited in claim 2, further comprising:
receiving a plurality of packets at the second storage server head from the first storage server head via the interconnect, each of the packets including a header;
determining in the second storage server head whether the header is set to a predetermined value for each of the packets; and
retransmitting each of the packets for which the header is set to the predetermined value back to the first storage server head.

4. A method as recited in claim 1, further comprising:
generating a report of the operational status of the second storage server head; and
outputting the report to a user.

5. A method as recited in claim 1, wherein the interconnect comprises a passive backplane.

6. A method as recited in claim 5, wherein the first storage server head and the second storage server head are configured to communicate with each other only through the passive backplane.

7. A method as recited in claim 1, wherein each of the first and second storage server heads is configured to receive file-level access requests to provide the network attached storage as the storage network according to the user selection after deployment.

8. A method as recited in claim 1, wherein each of the first and second storage server heads is configured to provide block-level access to the mass storage devices, to provide the storage area network as the storage network according to the user selection after deployment.

9. A method as recited in claim 1, wherein at least one of the first storage server head and the second storage server head comprises, in a single chassis, a network interface by which to communicate with the host and a storage interface by which to communicate with the plurality of mass storage devices.

10. A method comprising:
assessing an operational status of a second storage server head by executing a diagnostic process by a diagnostic kernel in a first storage server head by transmitting a plurality of packets onto an interconnect using a Gigabit Ethernet protocol, wherein the interconnect comprises a passive backplane coupling the first storage server head to the second storage server head, the first and second storage server heads being independently operable in a cluster failover configuration to provide a host with access to a plurality of mass storage devices of a storage network, wherein each of the plurality of mass storage devices is coupled to the interconnect that couples the first storage server head to the second storage server head, wherein each of the first storage server head and the second storage server head comprises an identical diagnostic kernel, either of which is operable to initiate the diagnostic process to communicate with the other storage server head via the passive backplane;

receiving, at the first storage server head, zero or more of the plurality of packets back from the second storage server head via the interconnect, wherein the second storage server head receives the plurality of packets and responds to communicate the operational status of the second storage server head;

verifying, at the first storage server head, content of each of the plurality of packets received back from the second storage server head; and determining the operational status of the second storage server head based on results of said receiving and said verifying, wherein each of the first and second storage server heads is configurable to receive both file-level access requests and block-level access requests to store data onto the mass storage devices, to provide one of a storage area network and a network attached storage as the storage network according to a user selection after deployment.

11. A method as recited in claim 10, further comprising:
generating a report of the operational status of the second storage server head; and
outputting the report to a user.

12. A method as recited in claim 10, wherein said method is performed while the second storage server head is operating to provide the host with access to the plurality of mass storage devices.

13. A method as recited in claim 10, wherein each of the plurality of packets having a header set to a predetermined value, the method further comprising;

receiving zero or more of the plurality of packets at the second storage server head;

for each of the plurality of packets received at the second storage server head, determining in the second storage server head whether a header in each of the packets matches the predetermined value; and retransmitting each of the plurality of packets which was received at the second storage server head and which has the header matching the predetermined value, from the second storage server head back to the first storage server head via the interconnect, without further processing said packet in the second storage server head.

14. A method as recited in claim 10, wherein the interconnect is a passive backplane.

15. A method as recited in claim 14, wherein the first and second storage server heads are configured to communicate with each other only via the passive backplane.

16. A method as recited in claim 10, wherein each of the first and second storage server heads is configured to receive file-level access requests to provide the network attached storage as the storage network according to the user selection after deployment.

17. A method as recited in claim 10, wherein each of the first and second storage server heads is configured to provide block-level access to the mass storage devices to provide the storage area network as the storage network according to the user selection after deployment.

18. A method as recited in claim 10, wherein at least one of the first storage sewer head and the second storage server head comprises, in a single chassis, a network interface by which to communicate with the host and a storage interface by which to communicate with the plurality of mass storage devices.

19. A method comprising:

assessing an operational status of a second storage server head by executing a diagnostic process by a diagnostic kernel in a first storage server head by transmitting a plurality of packets onto an interconnect using a Gigabit Ethernet protocol, wherein the interconnect comprises a passive backplane coupling the first storage server head to the second storage server head, each of the plurality of packets having a header set to a predetermined value, the first and second storage server heads being independently operable in a cluster failover configuration to provide a host with access to a plurality of mass storage devices of a storage network, wherein each of the first storage server head and the second storage server head comprises an identical diagnostic kernel, either of which is operable to initiate the diagnostic process to communicate with the other storage server head via the passive backplane;

receiving zero or more of the plurality of packets at the second storage server head via the interconnect, wherein the second storage server head receives the plurality of packets and responds to communicate the operational status of the second storage server head;

for each of the plurality of packets received at the second storage server head, determining in the second storage server head whether a header in each of the packets matches the predetermined value;

retransmitting each of the plurality of packets which was received at the second storage server head and which has the header matching the predetermined value, from the second storage server head back to the first storage server head via the interconnect, to respond to the received packets without further processing said packet in the second storage server head;

receiving at least some of the retransmitted plurality of packets at the first storage server head;

determining in the first storage server head whether all of the plurality of packets have been returned by the second storage server head;

verifying content of the retransmitted packets received at the first storage server head relative to the plurality of packets;

generating a report of the operational status of the second storage server head based on results of said determining and said verifying; and outputting the report to a user, wherein each of the first and second storage server heads is configurable to receive both file-level access requests and block-level access requests to store data onto the mass storage devices, to provide one of a storage area network and a network attached storage as the storage network according to a user selection after deployment.

20. A method as recited in claim 19, wherein said method is performed while the second storage server head is operating to provide the host with access to the plurality of mass storage devices.

21. A method as recited in claim 19, wherein the interconnect is a passive backplane.

22. A method as recited in claim 21, wherein the first and second storage server heads are configured to communicate with each other only via the passive backplane.

23. A method as recited in claim 19, wherein each of the first and second storage server heads is configured to receive file-level access requests to provide network attached storage as the storage network according to the user selection after deployment.

24. A method as recited in claim 19, wherein each of the first and second storage server heads is configured to provide block-level access to the mass storage devices of a storage area network as the storage network according to the user selection after deployment.

25. A method as recited in claim 19, wherein at least one of the first storage server head and the second storage server head comprises, in a single chassis, a network interface by which to communicate with the host and a storage interface by which to communicate with the plurality of mass storage devices.

26. A storage system comprising:
a first storage server head; and
a second storage server head coupled to the first storage server head via an interconnect, the interconnect comprising a passive backplane, the first and second storage server heads being configured in a cluster failover configuration to redundantly provide a host with access to a plurality of mass storage devices of a storage network, the first storage server head being configured to assess an operational status of the second storage server head by executing a diagnostic process to verify the presence of a communication link with the second storage server head while the second storage server head is in a mode for providing the host with access to the plurality of mass storage devices, wherein a diagnostic kernel in the first storage server head sends a signal to the second storage server head over the passive backplane using a Gigabit Ethernet protocol and the second storage server head receives the signal and responds to communicate the operational status of the second storage server head, wherein each of the plurality of mass storage devices is coupled to the interconnect coupling the first storage server head to the second storage server head, wherein each of the first storage server head and the second storage server head comprises an identical diagnostic kernel, either of which is operable to initiate the diagnostic process to communicate with the other storage server head via the passive backplane,
wherein each of the first and second storage server heads is configurable to receive both file-level access requests and block-level access requests to store data onto the mass storage devices, to provide one of a storage area network and a network attached storage as the storage network according to a user selection after deployment.

27. A storage system as recited in claim 26, wherein the diagnostic process comprises:
transmitting a set of data from the first storage server head onto an interconnect coupling the first storage server head to the second storage sewer head;
determining in the first storage server head whether at least some of the set of data has been returned by the second storage server head via the interconnect;
verifying, at the first storage server head, content of any of said data returned by the second storage server head; and
determining operational status of the second storage server head based on results of said verifying.

28. A storage system as recited in claim 27, wherein the diagnostic process further comprises:
receiving a plurality of packets at the second storage server head from the first storage server head via the interconnect, each of the packets including a header;
determining in the second storage server head whether the header is set to a predetermined value for each of the packets; and
retransmitting each of the packets for which the header is set to the predetermined value back to the first storage server head.

29. A storage system as recited in claim 27, wherein the first storage server head and the second storage server head are configured to communicate with each other only through the interconnect.

30. A storage system as recited in claim 26, wherein each of the first and second storage server heads is configured to receive file-level access requests to provide network attached storage as the storage network according to the user selection after deployment.

31. A storage system as recited in claim 26, wherein each of the first and second storage server heads is configured to provide block-level access to the mass storage devices to provide a storage area network as the storage network according to the user selection after deployment.

32. A storage system as recited in claim 26, wherein the first storage server head comprises, in a single chassis, a network interface by which to communicate with the host and a storage interface by which to communicate with the plurality of mass storage devices.

33. A storage system as recited in claim 26, wherein the second storage server head comprises, in a single chassis, a network interface by which to communicate with the host and a storage interface by which to communicate with the plurality of mass storage devices.

34. A storage system as recited in claim 26, wherein each of the first storage server head and the second storage server head comprises, in a single chassis, a network interface by which to communicate with the host and a storage interface by which to communicate with the plurality of mass storage devices.

35. A storage system comprising:
an enclosure;
a passive backplane installed within the enclosure;
a first storage server head within the enclosure, implemented on a first single circuit board coupled to the passive backplane, to control access by an external host to a plurality of mass storage devices of a storage network; and
a second storage server head within the enclosure, implemented on a second single circuit board coupled to the passive backplane, to control access by the external host to the plurality of mass storage devices and operable redundantly to the first storage server head, the first storage server head and the second storage server head being coupled to communicate with each other via the passive backplane using a Gigabit Ethernet protocol, the first storage server head being configured to assess an operational status of the second storage server head by executing a diagnostic process to verify the presence of a communication link with the second storage server head while the second storage server head is in a mode for providing the external host with access to the plurality of mass storage devices, wherein a diagnostic kernel in the first storage server head sends a signal to the second storage server head and the second storage server head receives the signal and responds to communicate the operational status of the second storage server head, wherein each of the plurality of mass storage devices is coupled to a same interconnect coupling the first storage server head to the second storage server head, wherein each of the first storage server head and the second storage server head comprises an identical diagnostic kernel, either of which is operable to initiate the diagnostic process to communicate with other storage server head via the passive backplane, wherein each of the first and second storage server heads is configurable to receive both file-level access requests and block-level access requests to store data onto the mass storage devices, to provide one of a storage area network and a network attached storage as the storage network according to a user selection after deployment.

36. A storage system as recited in claim 35, wherein the diagnostic process comprises:

transmitting a set of data from the first storage server head onto an interconnect coupling the first storage server head to the second storage server head;

determining in the first storage server head whether at least some of the set of data has been returned by the second storage server head via the interconnect;

verifying, at the first storage server head, content of any of said data returned by the second storage server head; and determining operational status of the second storage server head based on results of said verifying.

37. A storage system as recited in claim 35, wherein the diagnostic process further comprises:

receiving a plurality of packets at the second storage server head from the first storage server head via the interconnect, each of the packets including a header;

determining in the second storage server head whether the header is set to a predetermined value for each of the packets; and retransmitting each of the packets for which the header is set to the predetermined value back to the first storage server head.

38. A storage system as recited in claim 35, wherein the first storage server head and the second storage server head are configured to communicate with each other only through the passive backplane.

39. A storage system as recited in claim 35, wherein each of the first and second storage server heads is configured to receive file-level access requests to provide the network attached storage as the storage network according to the user selection after deployment.

40. A storage system as recited in claim 35, wherein each of the first and second storage server heads is configured to provide block-level access to the mass storage devices to provide the storage area network as the storage network according to the user selection after deployment.

* * * * *